(12) United States Patent
Oldewurtel

(10) Patent No.: US 10,858,021 B2
(45) Date of Patent: Dec. 8, 2020

(54) METHOD FOR DETERMINING THE SPEED OF A RAIL-BOUND VEHICLE

(71) Applicant: Thales Management & Services Deutschland GmbH, Ditzingen (DE)

(72) Inventor: Kassen Oldewurtel, Markgroeningen (DE)

(73) Assignee: THALES MANAGEMENT & SERVICES DEUTSCHLAND GMBH, Ditzingen (DE)

( * ) Notice: Subject to any disclaimer, the term of this patent is extended or adjusted under 35 U.S.C. 154(b) by 257 days.

(21) Appl. No.: 15/920,864

(22) Filed: Mar. 14, 2018

(65) Prior Publication Data

US 2018/0201286 A1    Jul. 19, 2018

Related U.S. Application Data

(63) Continuation of application No. PCT/EP2016/070015, filed on Aug. 24, 2016.

(51) Int. Cl.
*G01P 3/66* (2006.01)
*B61L 25/02* (2006.01)
*B61L 1/16* (2006.01)

(52) U.S. Cl.
CPC ............ *B61L 25/021* (2013.01); *B61L 1/161* (2013.01); *B61L 1/165* (2013.01); *B61L 1/167* (2013.01); *G01P 3/66* (2013.01)

(58) Field of Classification Search
CPC ........ B61L 25/021; B61L 1/167; B61L 1/161; G01P 3/66
See application file for complete search history.

(56) References Cited

U.S. PATENT DOCUMENTS

| | | | |
|---|---|---|---|
| 5,395,078 A | 3/1995 | Gellender | |
| 5,825,177 A * | 10/1998 | Finnestad | B60L 3/10 |
| | | | 324/179 |
| 2007/0001059 A1 | 1/2007 | Appleby et al. | |

FOREIGN PATENT DOCUMENTS

| | | |
|---|---|---|
| CN | 101059542 A | 10/2007 |
| CN | 201561984 U | 8/2010 |

(Continued)

OTHER PUBLICATIONS

Martin Rosenberger and Christian Pucher, "Raddetektion mit Geschwindigkeitsausgabe bietet echten Mehrwert", Signal + Draht, DVV, Bd. 105, Nr. 5, May 1, 2013 (May 1, 2013), Seiten 12-16, XP001581371, ISSN: 0037-4997.

(Continued)

*Primary Examiner* — Toan M Le
(74) *Attorney, Agent, or Firm* — Hackler Daghighian Martino & Novak

(57) ABSTRACT

A method for determining the speed of a rail-bound vehicle, includes the following method steps: detection of a reference element, wherein the first detection device generates a first detection signal when the reference element passes the first detection device; detection of the reference element, wherein the second detection device generates a second detection signal when the reference element passes the second detection device; conversion of the detection signals into digital detection pulses; determining the time difference between the two detection pulses; wherein an XOR signal is generated in an XOR gate by linking the first and the second detection pulse using an XOR logic; and the duration of the XOR signal is determined; and wherein the time difference between the two detection pulses is determined by halving the duration of the XOR signal. The speed can be measured (Continued)

with higher accuracy when using an existing infrastructure without additional assembly work.

10 Claims, 3 Drawing Sheets

(56) References Cited

FOREIGN PATENT DOCUMENTS

| CN | 101907656 A | 12/2010 |
|---|---|---|
| CN | 104477212 A | 4/2015 |
| DE | 195 26 816 A1 | 1/1997 |
| DE | 97 36 711 C1 | 11/1998 |
| DE | 10 2004 012170 A1 | 10/2005 |
| DE | 10 2011 005699 A1 | 9/2012 |
| EP | 1 746 009 A2 | 1/2007 |
| JP | S4850768 U | 7/1973 |
| JP | S5291562 U | 7/1977 |
| JP | S5419782 A | 2/1979 |
| JP | S5419782 Y2 | 7/1979 |
| JP | S5580057 A | 6/1980 |
| JP | S60 4865 A | 1/1985 |
| JP | H03135772 A | 6/1991 |
| JP | 2013-200155 A | 10/2013 |
| SU | 1278716 A1 | 12/1986 |
| WO | 99/11497 A1 | 3/1999 |

OTHER PUBLICATIONS

Gerhand Grundig et al.: "Anwendungsmoeglichkeiten von Raddetektionssystemen mit induktiven Radsensoren", Signal + Draht, DVV, Bd. 106, Nr. 6, Jun. 1, 2014 (Jun. 1, 2014), Seiten 24-28, XP001589475, ISSN: 0037-4997.

* cited by examiner

METHOD FOR DETERMINING THE SPEED OF A RAIL-BOUND VEHICLE

CROSS-REFERENCE TO RELATED APPLICATIONS

This continuation application claims priority to PCT/EP2016/070015 filed on Aug. 24, 2016 which has published as WO 2017/045888 A1 and also the German application number 10 2015 217 535.9 filed on Sep. 14, 2015, the entire contents of which are fully incorporated herein with these references.

DESCRIPTION

Field of the Invention

The invention relates to a method for determining the speed of a rail-bound vehicle, comprising the following method steps: detection of a reference element of a vehicle by means of a first detection device, wherein the first detection device generates a first detection signal when the reference element passes the first detection device; detection of the reference element by means of a second detection device which is disposed at a distance from the first detection device in the travelling direction, wherein the second detection generates a second detection signal when the reference element passes the second detection device; conversion of the detection signals into digital detection pulses; and determining the time difference between the two detection pulses.

Background of the Invention

A method of this type is used for example in the interlocking-dependent speed control AlTrac 6420 SSU (speed supervision unit) of Thales Rail Signalling Solutions GmbH.

In the known method for determining the speed, pairs of detection devices are mounted along the track. When a rail vehicle passes a detection device, a signal is induced in the detection device which is converted into a digital pulse. The speed of the passing vehicle can be determined from the time difference between the rising edges of the two pulse signals of the detection device pair and the known distance between the two detection devices. In order to guarantee sufficient accuracy of the speed measurement, the detection devices must be mounted at a distance of at least 2000 mm. For this reason, detection devices must be mounted at a suitable distance in order to determine the speed.

SUMMARY OF THE INVENTION

Object of the Invention

It is the object of the invention to propose a method for measuring the speed of a rail-bound vehicle, which permits measurement of the speed with a higher accuracy, in particular with minimum assembly work.

DESCRIPTION OF THE INVENTION

This object is achieved in accordance with the invention by a method in accordance with claim 1.

In accordance with the present invention, an XOR signal is generated in an XOR gate by linking the first and the second detection pulse using an XOR logic, and the duration of the XOR signal is determined. The time difference between the two detection pulses is determined by halving the duration of the XOR signal.

In contrast to prior art, for determining the time difference, not the distance between the rising flanks of the detection pulses is determined but the distance between the centers of the detection pulses. For this reason, the inventive method permits to determine the exact speed even if the two detection pulses have different lengths, for example due to e.g. tolerances or different adjustment of the two detection units, since fluctuations in the pulse length generally always occur around the pulse center.

By using the XOR operation, it is possible to determine the center of the detection pulses despite overlapping detection pulses without outputting each detection pulse and evaluating the respective positions of the detection pulses with respect to one another. For this reason, the inventive method also permits detection of the speed of a rail-bound vehicle with high accuracy when the detection devices are arranged close to one another and there is the danger that detection pulses overlap.

Preferred Variants of the Inventive Method

A counter of a binary counter device preferably generates count signals with a predetermined clock frequency as long as the XOR logic outputs "true". The duration of the XOR signal is then determined from the number of count signals. The detection of the count signals is thus realized by incrementing a counter of the binary counter device by an applied signal (XOR signal) at the clock input. When the clock frequency and the number N of detected count signals is known, the duration of the XOR signal can be determined ($N*1/f$).

The counter of the binary counter device is preferably started as soon as the XOR logic outputs "true". Reading out of the counter is preferably performed after termination of the second detection pulse.

In one particularly preferred variant, the binary counter device is part of a counting point, in particular of an axle counting point.

It is moreover advantageous to use sensors of an axle counting point as detection devices. In this case, an axle of the vehicle is used as reference element on the vehicle. In this fashion, it is possible to perform a more exact speed determination by using the infrastructure that is already present along the trackside (in particular axle counting points) i.e. without additional assembly work.

Since it is possible by means of the inventive method to determine the center of the pulses even with overlapping pulses using an XOR operation and thus to determine the speed of the vehicle with high accuracy, in a particularly preferred variant of the inventive method, the distance between the first and the second detection device is selected to be that small that the detection pulses overlap in time.

In a particularly preferred manner, the distance between the two detection devices is selected to be 148 mm, preferably 140 mm. This corresponds approximately to the separation between the detection devices in a conventional axle counting point.

First and second digital detection pulses are preferably generated for different reference points of the same vehicle. For determining the average speed of the vehicle, the duration of the XOR signals for all reference points is summed up and the time difference between the two digital detection pulses is determined by halving the duration of the average value of the XOR signals.

Further advantages of the invention can be extracted from the description and the drawing. The features mentioned above and below may be used individually or collectively in arbitrary combination. The embodiments shown and described are not to be understood as exhaustive enumeration but have exemplary character for describing the invention.

DETAILED DESCRIPTION OF THE PREFERRED EMBODIMENTS

Figure 1:
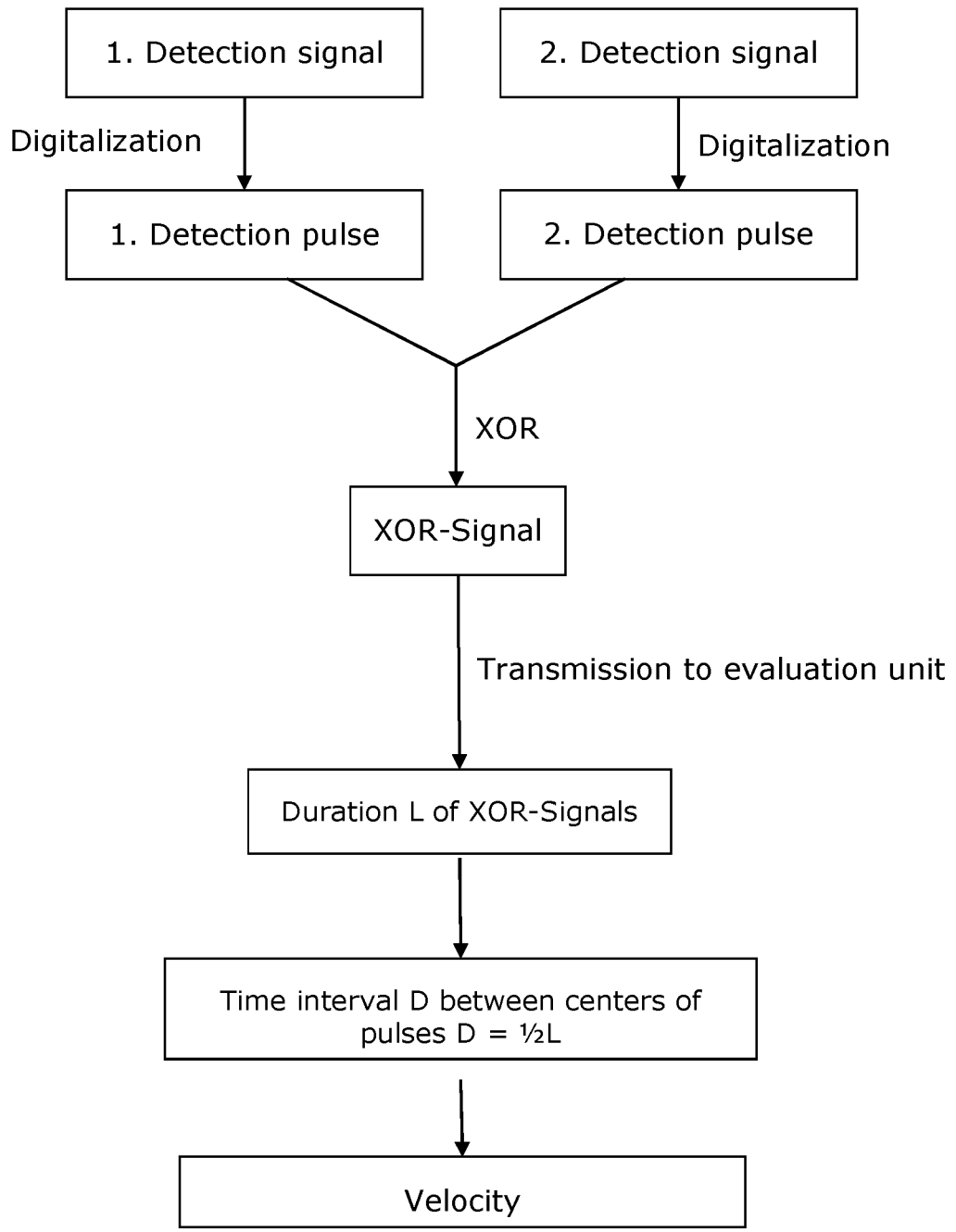
FIG. 1 shows a diagram of the individual method steps.
Figure 2:
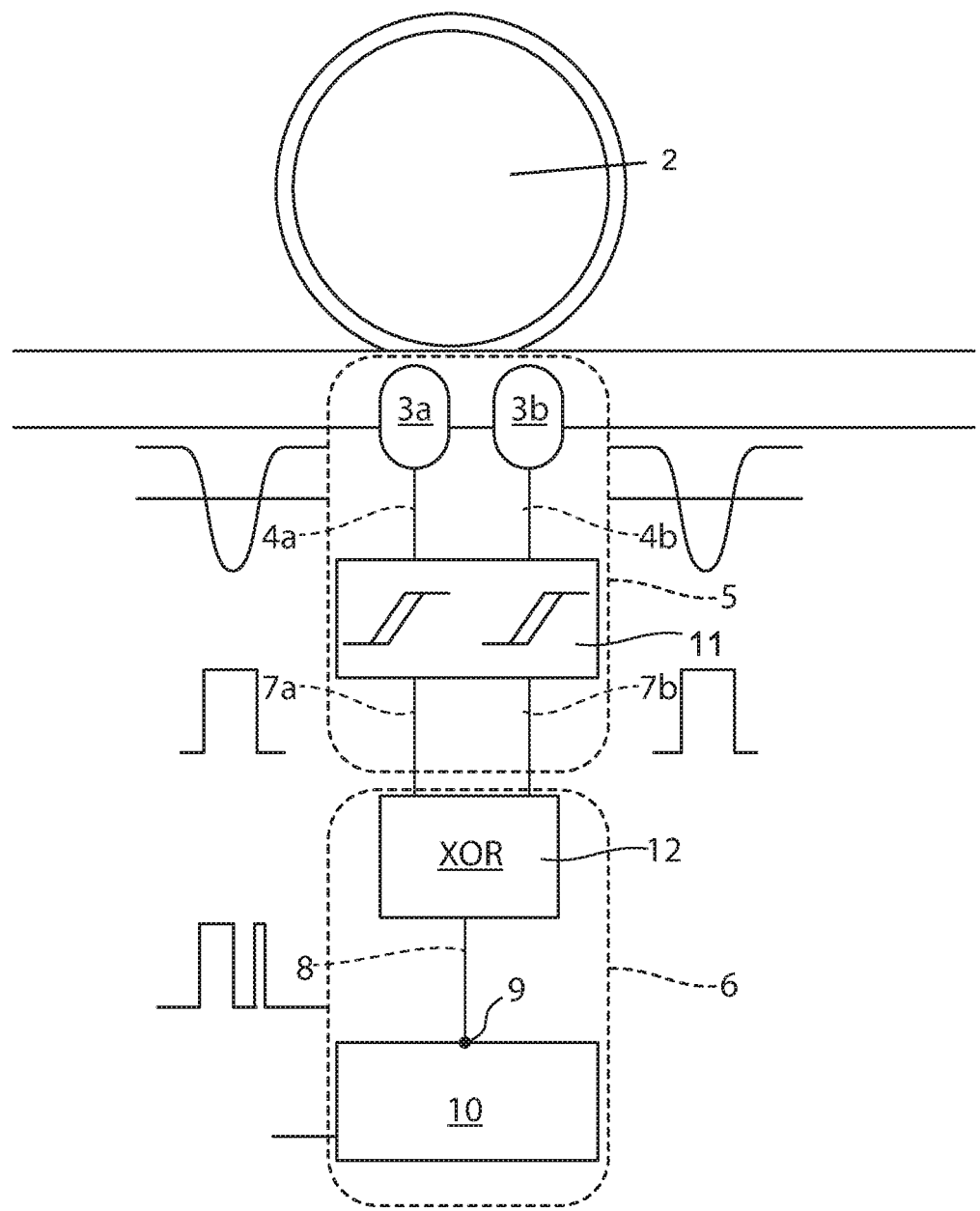
FIG. 2 shows a structure of an arrangement that is suitable for the inventive method.
Figures 3A, 3B, 3C, 3D, 3E:
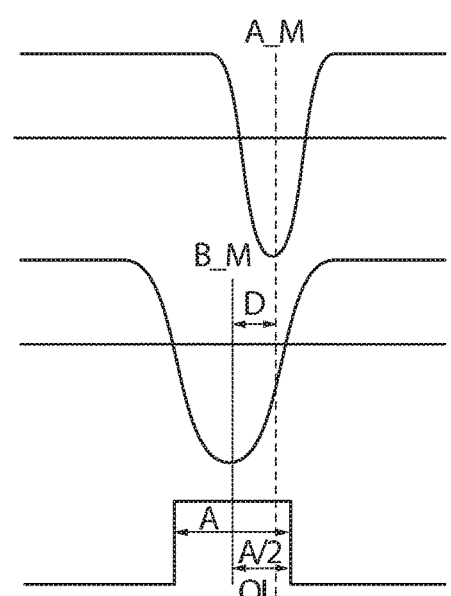
FIG. 3a shows an analog first detection signal.
FIG. 3b shows an analog second detection signal.
FIG. 3c shows a digital first detection pulse.
FIG. 3d shows a digital second detection pulse.
FIG. 3e shows an XOR signal of the first and second detection pulse from FIGS. 3c and 3d, output by the detection device.

The method steps of the inventive method shown in FIG. 1 are described below:

At first, a reference element 2 that is mounted to a rail-bound vehicle 1 is detected at two detection devices 3a, 3b that are arranged at a distance from one another in that an analog detection signal 4a, 4b is detected in the detection devices 3a, 3b during passage of the reference element e.g. by induction or optically. The reference element 2 may e.g. be an axle or an RFID tag. In this case, the detection devices 3a, 3b are designed as sensors of an axle counting point or as RFID reading devices, respectively. In the illustrated example, sensors of a counting point 5 are used as detection devices 3a, 3b, the counting point being connected to an evaluation unit 6. This counting point 5 may be an axle counting point of an axle counter or a counting point that detects and counts transponder signals (according to the reference element 2 used). The analog detection signals 4a, 4b detected by the sensors 3a, 3b are converted by a counter unit 11 of the counting point 5 into digital detection pulses 7a, 7b, as illustrated in FIGS. 3c, 3d.

In the illustrated example, the analog detection signals 4a, 4b each comprise a dropping curve with flanks of different steepness which may be due e.g. by differing matching of the detection devices 3a, 3b by different tolerances of the construction elements of different adjustment of the two detection devices 3a, 3b. Accordingly, the digital detection pulses 7a, 7b have different widths (pulse width of the first detection pulse 7a: A, pulse width of the second detection pulse 7b: B). Moreover, in the illustrated example detection devices 3a, 3b were used, the distance d between which is relatively small such that the two detection signals 4a, 4b or detection pulses 7a, 7b overlap in time by an overlap width OL.

The evaluation unit 6 comprises an XOR gate 12 and a binary counter device 10. An XOR signal 8 is generated in the XOR gate 12 by an XOR operation, which signal indicates those time intervals in which the reference element 2 is detected only by one of the two detecting devices 3a, 3b in each case. The time difference (time interval) D between the centers of the detection signals 4a, 4b or the detection pulses 7a, 7b (center of the detection signals 4a, 4b=center of the detection pulses 7a, 7b) is then determined from the duration (overall width) L of the XOR signal 8.

The overall width L of the XOR signal 8 is calculated from the sum of the pulse width A of the first detection pulse 7a and the pulse width B of the second detection pulse 7b minus the overlapping width OL:

$$L=A+B-2OL$$

The required time difference D of the centers of the detection signals 4a, 4b or the detection pulses 7a, 7b is then calculated as:

$$D=\tfrac{1}{2}A-OL+\tfrac{1}{2}B$$

or $$2D=A-2OL+B$$

thus resulting in:

$$D=\tfrac{1}{2}L$$

or $$v=d/D=2d/L$$

with d=distance between the detecting devices and v=speed to be determined (provided that the speed is constant).

The time difference D between the centers of the detection signals 4a, 4b or the detection pulses 7a, 7b is thus equal to half the sum width L of the XOR signal 8. The speed v to be determined is therefore $2d/L$.

The digital detection pulses 7a, 7b are transmitted to the evaluation device 6 where the XOR operation is performed by means of the XOR gate 12. The XOR signal 8 is applied to a clock input 9 of the binary counter device 10 of the evaluation unit 6 and the count signals are generated with a predetermined clock frequency (preferably 100 kHz-1 MHz) when the XOR signal 8 is applied to the clock input 9 (output of "high" of the XOR gate) as soon as the reference element 2 is detected only by one of the two detection devices 3a, 3b. The number of count signals is a measure of the sum width L of the XOR signal 8. Detection of the analog signals, digitization of the detection signals, XOR operation and generation of the count signals are performed simultaneously. This means that one does not have to wait until a reference element 2 has been detected by both detection devices 3a, 3b and all detection signals 4a, 4b are present before further data processing is started. The count signals of the binary counter device 10 can e.g. be always read out after two XOR pulses.

LIST OF REFERENCE NUMERALS 2 reference element
3a, 3b detection devices
4a, 4b detection signals
5 counting point
6 evaluation unit
7a, 7b detection pulses
8 XOR signal
9 clock input
10 binary counter device of the evaluation unit
11 counter unit of the counting point
12 XOR gate

What is claimed is:
1. A method for determining the speed of a rail-bound vehicle, comprising the method steps of:
 detecting a reference element of the vehicle by means of a first detection device, the first detection device generating a first detection signal when the reference element passes the first detection device;

detecting the reference element by means of a second detection device which is disposed at a distance from the first detection device in the travelling direction, the second detection device generating a second detection signal when the reference element passes the second detection device;

converting the detection signals into digital detection pulses;

determining the time difference between the two detection pulses;

generating an XOR signal in an XOR gate by linking the first and the second detection pulse using an XOR logic, and determining the duration of the XOR signal; and determining the time difference between the two detection pulses by halving the duration of the XOR signal.

2. The method according to claim 1, wherein a counter of a binary counter device generates count signals with a predetermined clock frequency as long as the XOR logic outputs "true", and wherein the duration of the XOR signal is determined from the number of count signals.

3. The method according to claim 2, wherein the counter of the binary counter device is started as soon as the XOR logic outputs "true".

4. The method according to claim 3, wherein the binary counter device is part of an axle counting point.

5. The method according to claim 1, wherein sensors of an axle counting point are used as detection devices.

6. The method according to claim 1, wherein the distance between the first and the second detection device is selected to be sufficiently small such that the detection pulses overlap in time.

7. The method according to claim 1, wherein the distance between the two detection devices is ≤148 mm.

8. The method according to claim 1, wherein the distance between the two detection devices is ≤140 mm.

9. The method according to claim 1, wherein the first and second digital detection pulses are generated for different reference points of the same vehicle, and that for determining the average speed of the vehicle, the duration of the XOR signals for all reference points is summed up and the time difference between the two digital detection pulses is determined by halving the duration of the average value of the XOR signals.

10. The use of an axle counting point for determining the speed of the rail-bound vehicle by means of the method according to claim 1.

* * * * *

UNITED STATES PATENT AND TRADEMARK OFFICE
CERTIFICATE OF CORRECTION

PATENT NO. : 10,858,021 B2  
APPLICATION NO. : 15/920864  
DATED : December 8, 2020  
INVENTOR(S) : Kassen Oldewurtel Page 1 of 1

It is certified that error appears in the above-identified patent and that said Letters Patent is hereby corrected as shown below:

Page 2, in the References Cited, Foreign Patent Documents, "DE 97 36 711 C1 11/1998" should read ---DE 197 36 711 C1 11/1998--.

Signed and Sealed this  
Twelfth Day of January, 2021

Andrei Iancu  
*Director of the United States Patent and Trademark Office*